United States Patent

Awad

[11] 4,007,838
[45] Feb. 15, 1977

[54] FLEXIBLE SEALED LIQUID CONTAINING PACKET

[76] Inventor: Nagi M. Awad, 80 Riverdale Ave., Yonkers, N.Y. 10701

[22] Filed: Oct. 1, 1975

[21] Appl. No.: 618,448

[52] U.S. Cl. .................................. 206/484; 53/39; 206/812; 229/3.5 MF
[51] Int. Cl.² ...................................... B65D 75/00
[58] Field of Search ............... 53/37, 39; 206/205, 206/484, 498, 525, 530–532, 812; 222/92, 107; 229/3.5 MF, 66; 426/106, 122–123, 126–127, 410, 412

[56] References Cited

UNITED STATES PATENTS

| 2,750,075 | 6/1956 | Land et al. | 206/484 X |
| 2,976,988 | 3/1961 | Schneider | 206/484 X |
| 3,036,894 | 5/1962 | Forestiere | 206/484 X |
| 3,342,324 | 9/1967 | Piazze | 229/66 X |
| 3,531,906 | 10/1970 | Bjorkengren | 53/39 X |
| 3,913,789 | 10/1975 | Miller | 206/498 X |

*Primary Examiner*—Steven E. Lipman
*Attorney, Agent, or Firm*—J. B. Felshin

[57] ABSTRACT

This packet is so constructed as to prevent formation of liquid blisters at sealing areas, which are potential break points and which reduces the shelf life of the packet and does not look good and can cause loss of sterility. The packet has opposed walls which are sealed together at opposite sides and at one end, leaving the other end open for injection of liquid. The open end is lastly sealed. Capillary action of the liquid along the insides of the side seams of the packet can often reach the lastly sealed open end before sealing is accomplished, to cause a blister or weak point which can rupture. The present packet is provided with breaks in the side seams and below the top seam to delay capillary action of the liquid along the inside of the side seams from reaching the open end of the packet before said open end can be sealed, thus preventing formation of liquid blisters at the last sealed area of the packet.

12 Claims, 8 Drawing Figures

U.S. Patent                    Feb. 15, 1977                    4,007,838
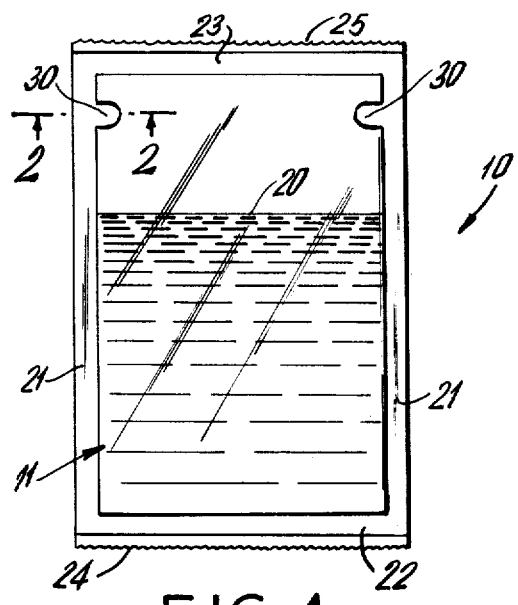
FIG. 1
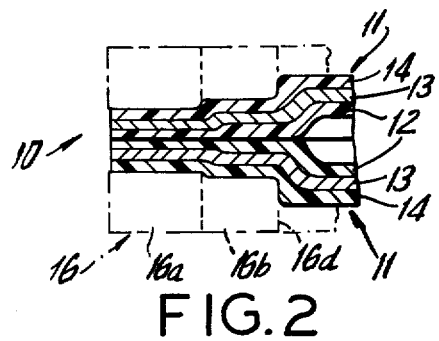
FIG. 2
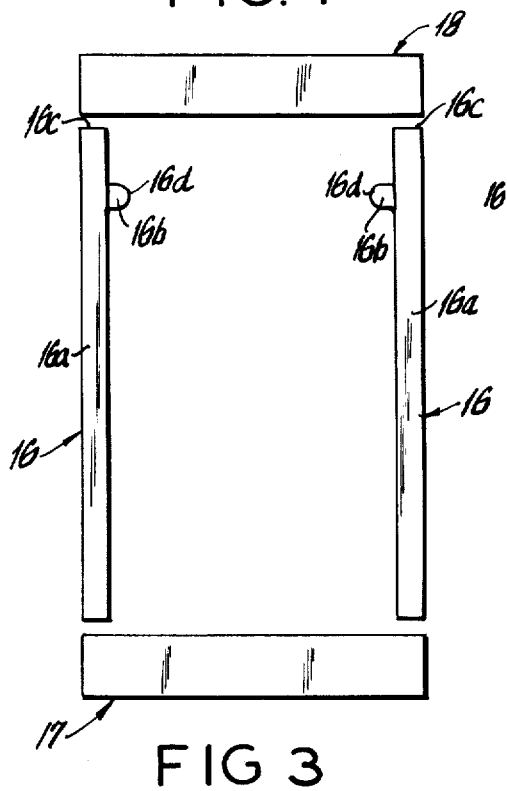
FIG 3
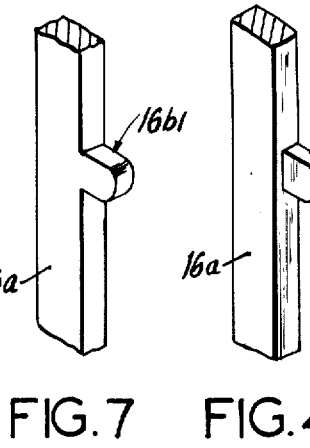
FIG.7   FIG.4
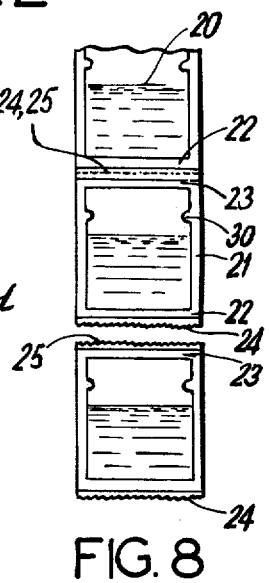
FIG. 8
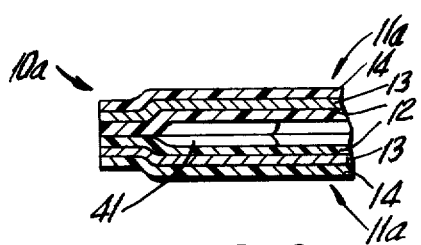
FIG 6
FIG 5

FLEXIBLE SEALED LIQUID CONTAINING PACKET

This invention relates to packets containing free liquid such as dye, soap, bloodstain liquid, a towel soaked in free liquid or the like.

Heretofore, such packets comprised front and back superposed walls or pieces of film which were usually sealed first along their opposed side edges and then along a lower end. Then the liquid was injected into the packets. Lastly, the upper open end of this packet was sealed. The sealing was often done by application of heated dies. Sealing could be done also by infra red rays or ultrasonic sealing or can be done by any other means.

It has been found that with such procedure, as heretofore practiced, liquid inserted into the packet has a tendency to flow quickly up along the insides of the side seams of the packet, and reach the upper ends of said side seams, before the upper open end could be sealed. Liquid reaching the ends of the upper sealed area often formed blisters containing liquid, which were potential weak points and often ruptured causing leaks, reducing shelf life of the packet, and the contents of the packet sometimes lost its sterility.

It is hence one object of this invention to provide a highly improved packet of the character described which shall obviate the difficulties or prior packets by providing means to prevent blistering of the packet walls at sealed areas and to allow for complete sealing and obviating formation of weak points which may rupture and cause leaks in the packet.

Another object of this invention is to provide a packet of the character described which shall have a bottom seal, side seals and a top seal, and means to delay flow of liquid in the packet by capillary action along the insides of the side seams to the upper sealing area of the packet before the top seal can be applied, thereby preventing formation of liquid blisters at the ends of the top sealing area.

Yet another object of this invention is to provide a highly improved packet of the character described, in which the side seams of the packet are formed with sealed portions extending inwardly from the side seams, below the upper sealing area, to delay flow of liquid by capillary action, to thereby allow the upper ends of the packet to be sealed before the liquid can reach the upper sealing area.

Still another object of this invention is to provide a packet of the character described having means to cause flow of liquid upwardly along the side seams to flow in direction at right angles to the side seams before reaching the upper ends of the side seams, to thereby delay flow of liquid by capillary action from reaching the upper ends of the side seams too soon and to thereby allow the upper end of the packet to be sealed fully throughout.

A further object of this invention is to provide a packet of the character described which shall comprise outer layers of liquid barrier film and inner layers of sealing film.

A still further object of this invention is to provide a highly improved packet of the character described in which a layer of metal foil such as aluminum foil, is interposed between the liquid barrier layer and the sealing layer, so that the contents of the packet cannot be viewed from the outside of the packet.

Yet a further object of this invention is to provide a packet of the character described in which the portions of opposite walls of the packet which are sealed inwardly of the side seams, below the upper sealed end of the packet, are thicker than the remaining walls of the packet, for extra strength at such inwardly extending sealed points, to prevent rupturing at such points.

A further object of this invention is to provide a strong and durable packet of the character described which shall be fully sealed all around the edges, free of blistering, which shall be relatively inexpensive to manufacture and which shall yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described and of which the scope of invention will be indicated in the following claims.

IN THE DRAWINGS

FIG. 1 is a plan view of a packet embodying the invention;

FIG. 2 is an enlarged cross-sectional view taken on line 2—2 of FIG. 1, but showing part of the dies for making the packet, in cross-section;

FIG. 3 is an exploded view of heated dies used for making the packet shown in FIG. 1;

FIG. 4 is a partial perspective view of one of the side dies for making the packet of FIG. 1;

FIG. 5 is a plan view of a modified packet embodying the invention;

FIG. 6 is an enlarged cross-sectional view taken on line 6—6 of FIG. 5;

FIG. 7 is a view like FIG. 4, and illustrating another form of the invention; and FIG. 8 shows how the packets could be made from continuous strips of plastic film.

Referring now in detail to the drawing, 10 designates a packet embodying the invention. Said packet 10 comprises a pair of similar, symmetrical front and rear multi-layered walls 11 preferably of rectangular shape. Each wall 11 comprises an inner sealing layer or film 12 which may be made of a copolymer, or polymer for example thermoplastic vinyl, an intermediate layer 13 of aluminum or other metal foil, and an outer layer 14 of water or liquid barrier film such as cellophane.

Layers 12 may be from 0.001 in. to 0.003 in. or more in thickness. Outer layers 14 may be about 0.001 in. or more in thickness. The inner sealing films are heat sealed films are heat sealed together by heated side dies 16; at the bottom by lower dies 17; and at the top by top dies 18.

The layers 12, 13, 14 may be adhered together by any suitable means such as adhesive.

FIG. 3 shows a set of dies 16, 17, 18 for the front wall of the packet. A similar, symmetrical set of dies are used for the rear wall of the packet. The dies are clamped toward each other to heat seal the packet.

Cicular dies may be used instead of flat dies, if desired.

The front and rear walls 11 are first sealed by the side dies 16, then sealed by the lower dies 17. Liquid content 20 is then injected into the packet thus formed through the remaining upper open end. Lastly, the top dies are applied to heat seal the upper end of the packet. The sealed sides of the packet are designated by numeral 21. The lower sealed end is designated by numeral 22. The upper sealed end is designated by numeral 23. The packet is cut along a lower zig zag or serrated end edge 24 and along an upper end edge 25, after it is loaded and fully sealed.

The sealing dies 16 for the front and rear walls each comprise an elongated length 16a and a finger 16b extending inwardly from length 16a at right angles thereto, near the upper end 16c thereof. The finger 16b has a rounded inner end edge 16d. The fingers 16b are thinner than the lengths 16a, and are outwardly offset from the inner surfaces of said length, so that the portions of the walls 11 of the packet are thickened where the fingers 16b seal the walls of the packet together at 30. It will be understood that the dies 16, 17, 18 are heated, and when the dies on opposite sides of the packet are pressed toward each other the portions of the packet which are contacted by the dies, are heat sealed together.

The fingers 16b also can be the same thickness and wholly in the plane of the lengths 16a as shown at 16b1 in FIG. 7, so that the portions of the walls 11 of the packet, where the fingers 16b1 seal the walls of the packet together at 30 are of the same thickness as the side seals 21 of the packet.

As shown in FIG. 2, the fingers 16b cause sealed together portions 30 of the packet to extend inwardly toward each other at same level at right angles to the side seams 21 just below the upper ends of the side seams formed by the side dies 16.

The side heated dies are applied first. Then the lower dies 17 are applied. The packet is cut at its upper end. Liquid is then injected into the packet. When that was done in the manufacture of packets heretofore, that had no sealed extensions 30, liquid, by capillary action, would quickly flow upwardly along the insides of the side seams 21 and reach the upper ends thereof before the top sealing by dies 18 could be accomplished. Such capillary action hence often causes liquid blisters at the upper ends of the packet producing weak points that caused rupture and leakage and loss of sterility. The extensions 30 in the packets 10, however prevented such blistering by delaying the flow of liquid by capillary action up the side seams, because the liquid had to flow around the extensions 30. This delay permitted complete and good sealing of the upper end of the packet before liquid in the packet could reach the upper sealing area 23 sealed by upper sealing dies 18.

The bottom seal of an upper packet and the top seal of a lower packet could be done simultaneously and cut in the middle to form the bottom seal 22 of the upper packet and the top seal 23 of the lower packet. Still the side heated dies are applied first then the bottom dies then the top dies. For this purpose the top and bottom seals are each wide enough as shown in FIG. 3 to seal to make both seals 22 and 23.

The delay of flow of liquid at the side seams can also be accomplished with packet 10a (FIG. 5 and 6), in which the side seams 40 have outwardly extending indentations 41. Such indentations are produced by making the side dies for packet 10a with notches at their inner sides and below their upper ends.

The packet 10a has front and rear walls 11a each composed of outer liquid barrier film 14, an intermediate layer 13 of metal foil such as aluminum foil, and an inner sealing film layer 12, same as with packet 10.

Rounding the lugs or extensions 16b as at 16d reduces the likelihood of rupture at the extensions 30. The notches 41 may have rounded inner ends as shown in FIG. 5 of the drawing to prevent weak points.

FIG. 8 shows the mechanical details of how the packet could be made if the process is done continuously from a roll of webbing (laminated plastic film). In this Figure, seals 22, 23 are sealed concurrently and cut to make edges 24, 25.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative.

I claim:

1. A packet comprising front and rear walls, sealed at its lower end by a lower seam, at its sides by side seams, at its upper end by a top seam, liquid in the packet, and said side seams, each having inner edges inside said packet, one extending upwardly from the lower seam and one extending down from the top seam, and a U-shaped edge interconnecting said upwardly and downwardly extending inner edges, and disposed transversely of said upwardly and downwardly extending edges, said U-shaped edges serving to delay flow of liquid in the packet by capillary action along the insides of said side seams from reaching the upper ends of said side seams, to facilitate effectuating seaming of the upper end of the packet to form said top seam before said liquid in the packet flows to the upper ends of said side seams by capillary action and reaches the portions of said front and rear walls that form the top seam when sealed.

2. The combination of claim 1, said U-shaped edges being in alignment.

3. The combination of claim 1, said ends of said U-shaped edges being rounded.

4. The combination of claim 1, said U-shaped edges comprising outwardly extending notches at the inner sides of the side seams terminating short of the outer edges of said side seams, and located below the upper ends of said side seams.

5. The combination of claim 4, said notches being in alignment.

6. The combination of claim 4, the inner ends of said notches being rounded.

7. The packet of claim 1, said U-shaped edges comprising sealed portions of said front and rear walls extending from the side seams, inwardly and spaced away from and below said top seam and forming spaces between said portions and said top seam.

8. The combination of claim 7, said U-shaped edges terminating short of each other.

9. The combination of claim 7, said inwardly extending portions being thicker than the combined thickness of said front and rear walls.

10. The combination of claim 9, the inner ends of said inwardly extending portion being rounded.

11. The combination of claim 1, said front and rear walls each comprising inner sealing film and outer liquid barrier film.

12. The combination of claim 11, and an intermediate metal foil layer.

* * * * *